United States Patent [19]
Pohle

[11] 4,413,909
[45] Nov. 8, 1983

[54] WAVEFRONT TILT MEASURING APPARATUS

[75] Inventor: Richard H. Pohle, Monta Vista, Calif.

[73] Assignee: Lockheed Missiles & Space Co., Inc., Sunnyvale, Calif.

[21] Appl. No.: 268,855

[22] Filed: Jun. 1, 1981

[51] Int. Cl.$^3$ .............................................. G01B 9/02
[52] U.S. Cl. .................................................. 356/354
[58] Field of Search ................................ 356/354, 353

[56] References Cited

U.S. PATENT DOCUMENTS

| | | | |
|---|---|---|---|
| 3,829,219 | 8/1974 | Wyant | 356/354 |
| 4,239,392 | 12/1980 | Pohle | 356/354 |
| 4,330,211 | 5/1982 | Peterson et al. | 356/354 |

Primary Examiner—Bruce Y. Arnold
Attorney, Agent, or Firm—John J. Morrissey

[57] ABSTRACT

Wavefronts defined by square subapertures (13, 14, 15) are focussed into spots of light on a grating (17) having two intersecting sets of lines, which diffract each wavefront into two coinciding zeroth order components and four spaced-apart first order components. For each wavefront, the various orders of diffraction components are collimated to form corresponding images of the subaperture defining the wavefront. Quadrant detectors (23, 24, 25) are located so that zeroth order image (301) of subaperture (13) fills all quadrants of detector (23), zeroth order image (401) of subaperture (14) fills all quadrants of detector (24), and zeroth order image (501) of subaperture (15) fills all quadrants of detector (25). The four first order images of each subaperture are spaced apart from each other, but overlap and interfere with four different portions of the zeroth order image: i.e., first order images (321, 322, 323, 324) overlap zeroth order image (301) to produce interference patterns ( 351, 352, 353, 354); first order images (421, 422, 423, 424) overlap zeroth order image (401) to produce interference patterns (451, 452, 453, 454); and first order images (521, 522, 523, 524) overlap zeroth order image (501) to produce interference patterns (551, 552, 553, 554). Each interference pattern on each detector appears on a different quadrant of that detector. Relative motion between the diffraction lines on grating (17) and the spots of light focussed onto grating (17) is provided in order to cause periodic temporal fluctuations in the intensities of the four interference patterns appearing on each of the detectors (23, 24, 25). Any phase difference occuring between the intensity fluctuations of interference patterns on corresponding quadrants of different detectors (23, 24, 25) is a measure of the relative positions of the spots of light with respect to the sets of lines on grating (17). The relative positions of the different spots of light on the grating (17) provide an indication of the relative tilts of corresponding subaperture wavefronts with respect to each other or with respect to a reference tilt.

30 Claims, 2 Drawing Figures

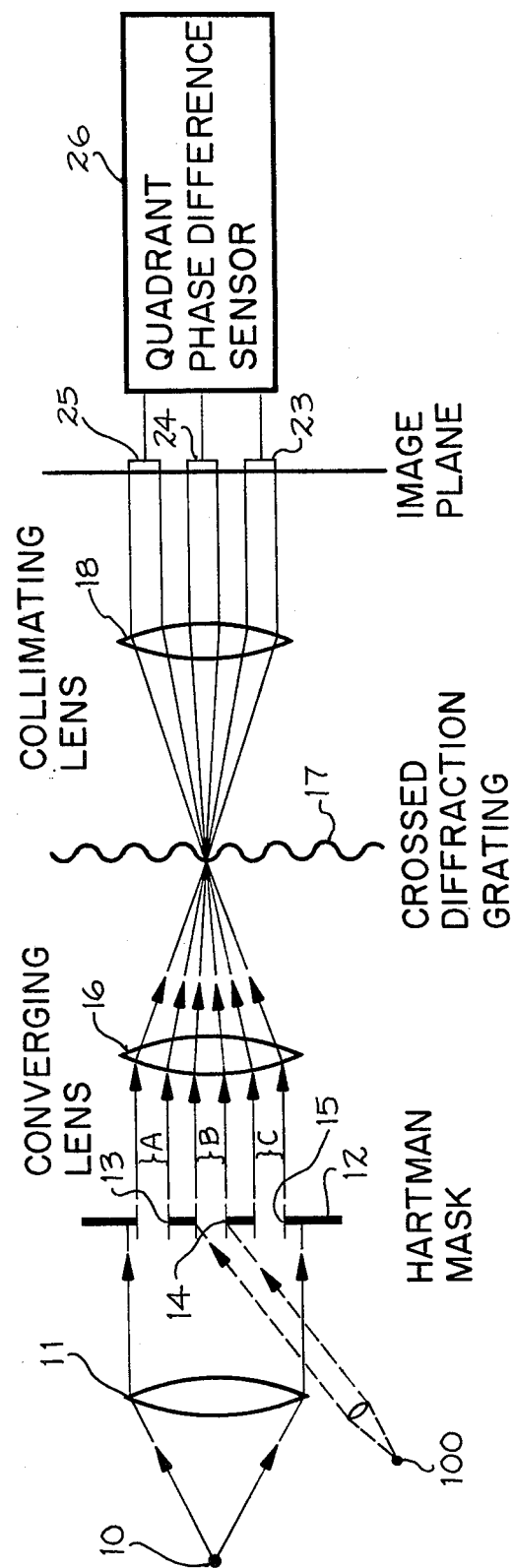

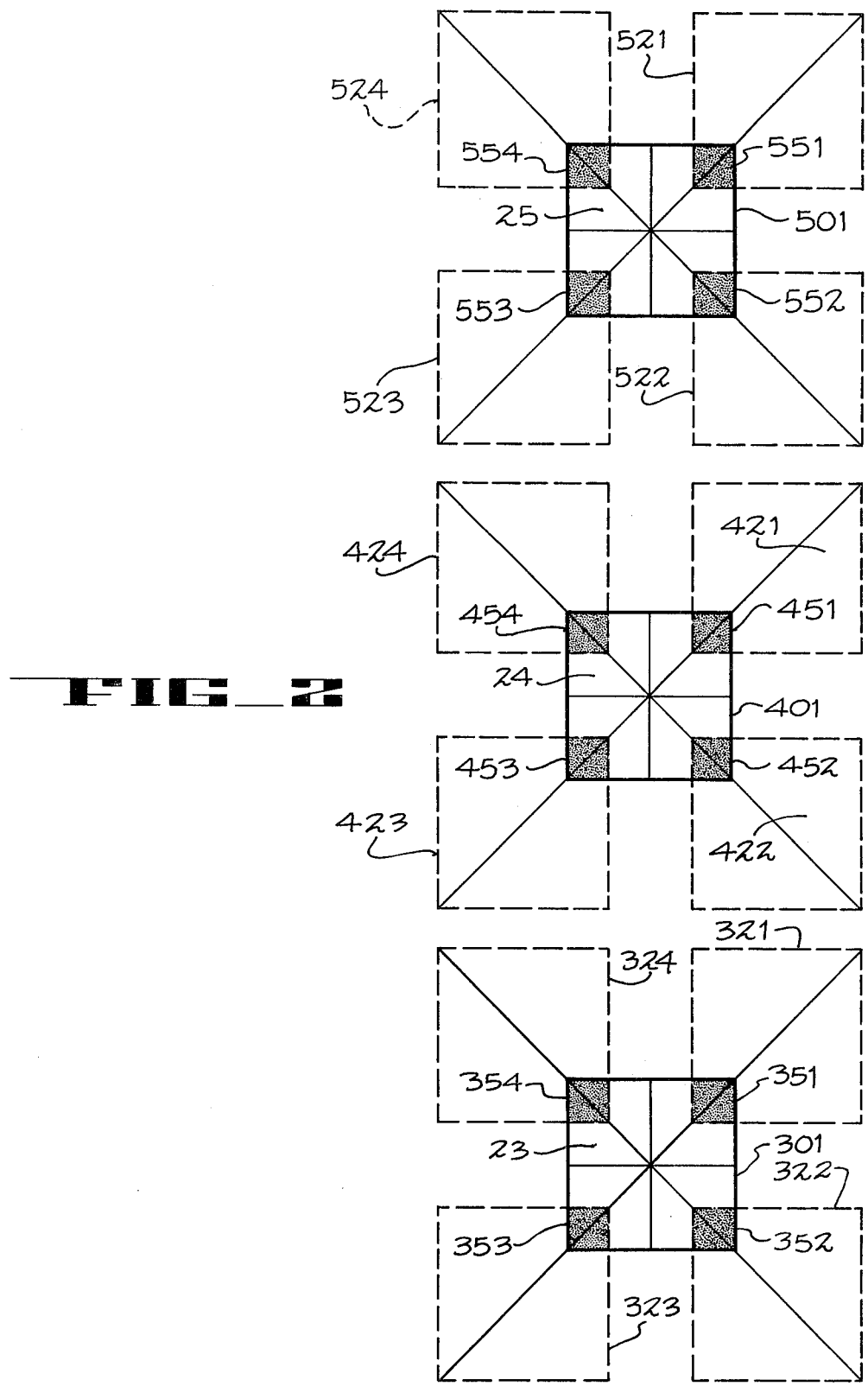
FIG_2

WAVEFRONT TILT MEASURING APPARATUS

TECHNICAL FIELD

This invention pertains generally to optical wavefront tilt measurement, and is applicable to Hartmann-type wavefront sampling instruments for beam control in laser systems.

BACKGROUND ART

An ability to detect and measure wavefront tilt and other wavefront aberrations is advantageous in maintaining direction and quality of optical beams. In space-based laser systems, where beam direction and quality are subject to degradation from thermal and mechanical stresses and from spacecraft maneuvering, the ability to measure wavefront tilt and other aberrations is especially useful in generating signals for actuating correction devices.

Interferometric techniques have been developed in the prior art to measure wavefront tilt and other wavefront aberrations for optical beams. For example, U.S. Pat. No. 3,829,219 describes a technique invented by James C. Wyant whereby information about the quality of an optical wavefront passing through an aperture can be otained from an interferogram formed when first order diffraction components produced by two different diffraction gratings are sheared in two mutually orthogonal directions simultaneously. However, the wavefront shearing technique described in the Wyant patent cannot be conveniently used in analyzing an optical beam with a Hartmann-type instrument.

In a conventional Hartmann analysis of an optical beam defined by an aperture, a beam sampling mechanism such as a mask having two or more subapertures covers the beam aperture to form a plurality of subaperture wavefronts. The tilts of the individual subaperture wavefronts are compared with a reference tilt and/or with each other to determine wavefront tilt and other aberrations of the beam. A sampling system for use in performing subaperture wavefront tilt analysis is described in U.S. Pat. No. 4,239,392 to Richard H. Pohle, applicant herein.

DESCRIPTION OF THE INVENTION

It is an object of the present invention to provide a method and apparatus for measuring tilt of a sample wavefront relative to a reference wavefront in an optical system.

It is a further object of the present invention to obtain tilt measurements simultaneously and independently with respect to each of two intersecting axes for one or more sample wavefronts and one or more reference wavefronts in an optical system.

In certain applications for the present invention, various sample and reference wavefronts whose tilts are to be measured are all derived from a single optical beam. In other applications, a reference wavefront (or a number of different reference wavefronts) could originate from a different source (or sources) than the beam to be analyzed, in which case the sample and reference wavefronts would be derived from different beams. In either type of application, in accordance with the invention, a set of subaperture stops is interposed in the beam or beams to define a set of subaperture wavefronts. Conventionally, using the Hartmann technique, a mask or screen having a set of subapertures covers the beam or beams so as to allow only the wavefronts formed by the subapertures to pass. Of the subaperture wavefronts so formed, one or more is designated as a sample wavefront or wavefronts and one or more is designated as a reference wavefront or wavefronts. Depending upon the nature of the optical system and the design features of the components of the system, the sample wavefront(s) and the reference wavefront(s) could be formed by the same or different sets of subaperture stops.

In accordance with the present invention, each of the subaperture wavefronts whose tilts are to be measured is focussed into a corresponding spot of light on a crossed diffraction grating, i.e., a diffraction grating having two intersecting sets of lines. Each of the focussed spots of light for the various subaperture wavefronts is larger than the spacing between adjacent lines on the diffraction grating, but is smaller than twice the spacing between adjacent lines. Each set of lines on the diffraction grating, independently of the other set of lines on the grating, causes each subaperture wavefront, independently of the other subaperture wavefront or wavefronts, to be diffracted into zeroth and higher order diffraction components. The zeroth order diffraction component of each subaperture wavefront is undeviated by the lines on the grating. However, the higher order diffraction components of each subaperture wavefront are deviated along two diffraction axes, which intersect each other and extend in directions normal to the lines on the grating. If one set of grating lines crosses the other set of grating lines at a right angle, the higher order diffraction components of each subaperture wavefront are deviated along diffraction axes that cross each other at a right angle.

For each subaperture wavefront that is focussed onto the diffraction grating, the zeroth and higher order diffraction components of the wavefront thereby produced are collected by a lens to form corresponding zeroth and higher order images of the subaperture defining the subaperture wavefront. The higher order images of the subaperture are displaced from the zeroth order image of the subaperture along each of the two intersecting diffraction axes. In general, if higher order images overlap the zeroth order image and/or each other, the overlapping images coherently interfere. In particular, overlapping of the first and zeroth order images of a particular subaperture causes coherent interference patterns to appear at four separate locations on the zeroth order image, viz., at the locations where the four first order images overlap the zeroth order image of the subaperture. Two interference patterns are formed along each of the diffraction axes, corresponding to coherent interference of two first order diffraction components with the zeroth order diffraction component of the subaperture wavefront along each diffraction axis.

Each spot of light focussed onto the diffraction grating overlies a portion of at least one line from each set of lines on the grating, and may overlie portions of two lines from each set of lines on the grating. Thus, the amount of light from each spot that can be transmitted through the grating to the collecting lens depends upon the position of the spot with respect to the two sets of lines on the grating. If the four first order images of a subaperture do not overlap each other but do overlap the zeroth order image of that subaperture, each particular interference pattern has an intensity that depends only upon the position of the focussed spot of light on the diffraction grating relative to the particular set of grating lines causing the particular first order image whose overlapping of the zeroth order image results in that particular interference pattern.

In practicing the present invention, separate detectors are placed at the zeroth order images of the various subapertures. Each detector has at least two independent intensity-sensitive elements, and is positioned so that each intensity-sensitive element is aligned with a different interference pattern on the zeroth order image of a particular subaperture. The four interference patterns appearing on each zeroth order image lie along two intersecting axes, called "image axes" or "measurement axes", which correspond to the two intersecting diffraction axes along which the higher order diffraction components of the subaperture wavefront are deviated.

In the preferred embodiment of the present invention, each detector is a quadrant detector: i.e., each detector has four intensity-sensitive elements, with each intensity-sensitive element occupying a different quadrant on the face of the detector. Each quadrant detector is positioned so that each intensity-sensitive element of the detector is aligned with a different one of the four interference patterns appearing on the zeroth order image of a particular subaperture. The intensities of the interference patterns along one image axis are measured by one pair of intensity-sensitive elements, and the intensities of the interference patterns along the other image axis are measured by the other pair of intensity-sensitive elements of the quadrant detector. In this way, four different intensity measurements can be made independently of each other by each quadrant detector. The two intensity-sensitive elements associated with a particular image axis on each quadrant detector are positioned diagonally with respect to each other on the face of the detector.

The two first order images that overlap the zeroth order image of a particular subaperture to form the two interference patterns appearing along a particular image axis are produced by the same set of lines on the diffraction grating. Hence, the intensities of the two interference patterns along that particular image axis, although independently measurable, are correlated with each other. However, the intensities of the two interference patterns appearing along either image axis are independent of the intensities of the two interference patterns appearing along the other image axis on the quadrant detector. Thus, intensity measurements made by intensity-sensitive elements along the same diagonal on the face of the quadrant detector are correlated with each other, and intensity measurements made by intensity-sensitive elements along different diagonals on the face of the quadrant detector are independent of each other. Therefore, when quadrant detectors are used, only two phase measurements are needed per detector because of the redundancy of the interference patterns along the same diagonal.

Translation of the diffraction grating lines relative to the spots of light into which the various subaperture wavefronts are focussed causes periodic temporal fluctuations in the intensities of the four interference patterns appearing on the zeroth order image of each of the subapertures defining the various subaperture wavefronts. If the spots have different positions on the grating relative to the two sets of diffraction lines on the grating, a phase difference occurs between the temporal fluctuations in intensity of corresponding interference patterns on the zeroth order images of the different subapertures. Since the diffraction lines on the grating appear to move across the spots, the quadrant detectors for the images of the different subapertures need not operate in an intensity-sensing mode, but can instead operate in a phase-sensing mode. Operation in a phase-sensing mode has the advantage of avoiding gain-dependent errors.

Any phase difference that occurs between the temporal fluctuations in intensity of interference patterns appearing on corresponding quadrants of two different quadrant detectors for the images of two different subapertures is a measure of the respective positions on the grating of the spots of light into which the two different subaperture wavefronts are focussed relative to the two sets of grating lines. The relative positions of two different spots on the grating can be described by an algorithm in terms of a measured phase difference between the temporal fluctuations in intensity of corresponding interference patterns on the zeroth order images of the subapertures defining the two subaperture wavefronts that form the spots. The algorithm depends upon the configuration of the grating lines and the locations of the spots on the grating. The relative positions of the spots on the grating provide an indication of the relative tilts of the subaperture wavefronts.

In one preferred embodiment of the invention, the diffraction grating comprises two crossed sets of lines on the face of a rotatable disc or bowl. Translation of the grating lines relative to the focussed spots of light for sample and reference wavefronts is accomplished by rotating the disc about its axis. The tilts of the sample and reference wavefronts are related to the relative positions of the corresponding spots of light on the grating. If the intensities of the interference patterns on corresponding quadrants of quadrant detectors for the images of two different subaperture wavefronts (e.g., the sample and reference wavefronts) are in phase with each other as the disc rotates, the spots are separated from each other by an integral number (0, 1, 2, . . . ) of grating periods. However, if the intensities of the interference patterns on corresponding quadrants of quadrant detectors for the images of two different subaperture wavefronts are not in phase with each other as the disc rotates, the spots are separated by a nonintegral number of grating periods. Ambiguity in the number of grating periods in the separation between the spots can be overcome by specially marking one or more of the grating lines.

The phase difference at any given time between the intensities of the interference patterns on corresponding quadrants of detectors for the images of a sample wavefront and a reference wavefront, respectively, is a measure of the relative positions on the diffraction grating of the focussed spots of light for the sample and reference wavefronts at that time. In the case of a diffraction grating of the rotary disc type where the spots of light into which the sample and reference wavefronts have been focussed are located at different radii on the disc, the spot at the inner radius passes through fewer grating periods than the spot at the outer radius per complete rotation of disc. Thus, when two subaperture wavefronts are focussed into spots of light lying at different radii on a diffraction grating of the rotary disc type, the fluctuations in intensity of the interference patterns on corresponding quadrants of separate detectors for the images of the subapertures defining the two wavefronts may not only be out of phase with respect to each other, but the phase difference between the intensity fluctuations for the two corresponding interference patterns may itself undergo change as the disc rotates.

The algorithm for describing the relative positions on a rotary disc diffraction grating of two different spots of light into which two different subaperture wavefronts have been focussed may be formulated in terms of a set of phase deviations from a set of carrier frequencies, where each particular carrier frequency corresponds to the number of grating periods through which a particular spot of light passes per unit of time as the disc rotates. Algorithms for expressing the relative positions with respect to each other of spots of light on a diffraction grating, where there is relative motion between the spots of light and the lines on the diffraction grating, are well-known for gratings of various configurations. Such algorithms are therefore not further described herein.

BRIEF DESCRIPTION OF DRAWING

FIG. 1 is a schematic representation of an optical wavefront tilt measuring apparatus according to the present invention.

FIG. 2 is an illustration of interference patterns appearing on the zeroth order images formed using the apparatus of FIG. 1.

BEST MODE OF CARRYING OUT THE INVENTION

In FIG. 1, the present invention is schematically illustrated in connection with a Hartmann-type wavefront sampling instrument. Substantially monochromatic electromagnetic radiation emanating from a source 10 (e.g., a laser) is passed through a collimating means such as a lens 11 to form an optical beam whose wavefront tilt and other aberrations are to be measured independently with respect to each of two intersecting axes. A beam sampling device 12 (e.g., a Hartmann mask, which could take the form of a set of gratings in the primary mirror of a beam expander as described in the aforementioned U.S. Pat. No. 4,239,392) having a set of subapertures, of which three representative subapertures 13, 14 and 15 are shown, is interposed in the beam to define a corresponding set of subaperture wavefronts A, B and C.

In accordance with the invention, the subaperture wavefront A may be considered as a reference wavefront having a known tilt with respect to each of the two intersecting axes that constitute the reference axes for the tilt measurements. For each of the other subaperture wavefronts B and C, whose tilts are to be compared to the tilts of the reference wavefront A, tilt measurements are made simultaneously with respect to either the reference axes for wavefront A or any two known reference axes. The reference axes are preferably orthogonal to the direction of propagation of the subaperture wavefronts A, B and C, although such orthogonality is not a requirement of the invention. Rays are shown in FIG. 1 to indicate the direction of propagation of the subaperture wavefronts A, B and C. Each subaperture wavefront is focussed by a focussing means such as a converging lens 16 to form a corresponding spot of light on a crossed diffraction grating 17. The spots of light from the various subaperture wavefronts may, but need not necessarily, overlap each other on the diffracting grating 17.

The diffraction grating 17 is conventional, and could comprise two intersecting sets of straight lines or curved lines. The lines could be sinusoidal or square (i.e., a Ronchi grating). The grating 17 could be a phase or amplitude grating, and could be provided on the surface of a rotatable disc or bowl of either the transparent or reflecting type. Alternatively, as would be recognized by persons skilled in the art, the diffraction grating 17 could comprise two intersecting sets of lines located on a cylindrical surface mounted for rotation about its longitudinal axis. The diffraction grating 17 could also comprise two intersecting sets of lines located on a flat plate mounted for translation or oscillation with respect to the spots of light formed by the focussed subaperture wavefronts A, B and C. The grating lines of one set preferably cross the grating lines of the other set at right angles on the grating 17.

Each set of lines on the diffraction grating 17 diffracts each of the subaperture wavefronts A, B and C into a zeroth order component and components of higher order. The zeroth order component of a particular subaperture wavefront passes through the grating 17 without being deviated, while the various higher order components are deviated away from the zeroth order component. The angular extent to which each higher order component of a particular wavefront is deviated away from the zeroth order component of that wavefront is given by an angle $\theta_n \cong n\lambda/d$, where the diffraction order n is an integer (i.e., $n = \ldots, -2, -1, 0, 1, 2, \ldots$), $\lambda$ is the wavelength of the radiation, and d is the spacing between adjacent lines on the diffraction grating 17. For the practice of this invention in its preferred mode, diffraction orders higher than the first order, i.e., $|n| \geq 2$, are not used. However, in principle this invention could be practiced using any two different diffraction orders (e.g., first and second, zeroth and second, etc.) that form overlapping images of each subaperture.

A lens 18 is provided to collect the zeroth order and the first order diffraction components of the subaperture wavefronts A, B and C into generally parallel subaperture beams. The lens 18 is large enough to collect substantially all the diffracted light in the diffraction orders of interest transmitted by the grating 17. Usually, the diffraction orders of interest are the zeroth and first orders, because most of the diffracted light goes into the zeroth and first diffraction orders. For particular applications, the single lens 18 could be replaced by a set of lenses, with a separate lens being used to collect and collimate the diffracted light for each subaperture wavefront. The dimensions and configuration of the lens 18, or of each lens in the set of lenses used in place of the single lens 18, are selected to accommodate large motions across the face of the diffraction grating 17 by the spots of light formed when the subaperture wavefronts A, B and C are focussed onto the grating 17.

Detectors 23, 24 and 25, which are preferably quadrant detectors, are positioned in the paths of the subaperture beams to detect images of the subapertures 13, 14 and 15, respectively, formed with the zeroth and first order diffraction components of the subaperture wavefronts A, B and C, respectively. For optimum performance, the detectors 23, 24 and 25 are positioned at the plane of the images formed by the lens 18 for the subapertures 13, 14 and 15.

The two reference axes with respect to which wavefront tilt measurements for the wavefronts A, B and C are to be made lie in the plane of the diffraction grating 17, and each reference axis is normal to a corresponding one of the two sets of intersecting grating lines. In the usual case, the two sets of lines on the diffraction grating 17 would intersect each other at a right angle, and the two reference axes would therefore be orthogonal to each other. It is again noted, however, that the invention could be practiced to obtain tilt measurements with respect to non-orthogonal reference axes.

The orientations of the intersecting lines on the diffraction grating 17 may vary from one region to another on the grating 17. In a particular embodiment of the invention, the intersecting lines may be formed as concentric Ronchi-type crossed grating annuli of different fixed radii on the surface of a rotatable disc or bowl, with the orientations and spacing of the intersecting lines on any one annulus being independent of the orientations and spacing of the intersecting lines on any other annulus. Each annulus would have a specially marked grating period to prevent ambiguity as to which particular grating period is causing diffraction of the focussed spot of light at any particular time. Where the orientations of the intersecting lines on the diffraction grating 17 vary from one region to another on the grating, the reference axes are correspondingly transformed by conventional digital or analog methods so that subaperture wavefront tilt measurements can be made with respect to a common set of axes.

In a particular application for the present invention, instead of using one or more of a plurality of subaperture wavefronts emanating from the same source 10 as the reference wavefront(s), a subaperture wavefront from a separate substantially monochromatic radiation source 100 could be used as the reference wavefront. Use of the separate radiation source 100 to provide a single reference wavefront precludes any necessity that the positions of the focussing lens 16 and the diffraction grating 17 be laterally stable with respected to the positions of the subapertures 13, 14 and 15. In another particular application, instead of providing a single reference wavefront from the single source 100, a number of different reference wavefronts from a number of different sources may be provided. The use of a number of different reference wavefronts precludes any need for specifying the focal length of the lens 16 and the displacement of the diffraction grating 17 from the subapertures 13, 14 and 15 with great precision. In yet another particular application, the focussing lens 16 could be replaced by a set of individual focussing lenses, with each individual lens being positioned to focus a corresponding one of the subaperture wavefronts A, B and C onto the diffraction grating 17. An apparatus using a set of individual lenses to focus the subaperture wavefronts individually onto the diffraction grating 17 would require mutual lateral stability for the individual focussing lenses.

As indicated by broken lines in FIG. 1, radiation emanating from the source 100 is shielded from the subapertures 13 and 15, and is allowed to pass only through the subaperture 14 as a collimated beam having wavefront B. Regardless of whether the reference wavefront is produced by a subaperture that permits passage of a reference wavefront from the same source 10 as the sample wavefronts, or whether the reference wavefront is provided by a separate source 100, the direction of propagation of the radiation from the source would typically be referenced in a conventional manner to a mirror (not shown) whose orientation relative to a reference direction is known.

In an alternative embodiment of the present invention, separate sample and reference wavefronts may be defined by a common aperture stop. The sample and reference wavefronts would then be focussed by a collimating lens or lenses onto separate regions of a diffraction grating of the chopper type. In that way, the common aperture stop may be separately imaged on each of the detectors.

When the subapertures 13, 14 and 15 are square, the diffraction grating 17 has a grating period that is smaller by a factor of $\sqrt{2}$ than the width of each spot of light focussed onto the grating 17. Square subapertures are preferred because the four square images thereby formed from the first order diffraction components of a particular subaperture wavefront, while spaced apart from each other, have maximum overlap on the image formed from the coinciding zeroth order diffraction components of that wavefront.

The zeroth and first order images of the apertures 13, 14 and 15, as they appear on the detectors 23, 24 and 25, respectively, are shown in FIG. 2. The zeroth order image 301 and the four first order images 321, 322, 323 and 324 of the subaperture 13 are seen to be square, indicating that the subaperture 13 is square. Similarly, the zeroth order image 401 and the four first order images 421, 422, 423 and 424 of the subaperture 14, and the zeroth order image 501 and the four first order images 521, 522, 523 and 524 of the subaperture 15, are all of square configuration. Although the particular shape of the subapertures 13, 14 and 15 is not critical to the practice of the invention, a square shape is preferred because the zeroth order image of each subaperture substantially fills the four quadrants of the corresponding quadrant detector for the subaperture when the subaperture is square. Thus, the zeroth order image 301 of the subaperture 13 substantially fills the quadrant detector 23. Similarly, the zeroth order image 401 of the subaperture 14 substantially fills the quadrant detector 24, and the zeroth order image 501 of the subaperture 15 substantially fills the quadrant detector 25. Also, with a square shape, the first order images of each subaperture can have maximum possible overlap on the zeroth order image of the subaperture without overlapping each other, thereby producing the most readily discernible interference patterns on the zeroth order image.

As shown in FIG. 2, the first order images 321, 322, 323 and 324 of the subaperture stop 13 are spaced apart from each other, but each first order image overlaps a different corner portion of the zeroth order image 301. Thus, four separate interference patterns 351, 352, 353 and 354 are produced on the zeroth order image 301, with each interference pattern appearing on a separate quadrant of the detector 23. Similarly, the first order images 421, 422, 423 and 424 of the subaperture stop 14 are spaced apart from each other, but each first order image overlaps a different corner portion of the zeroth order image 401 to produce four separate interferences patterns 451, 452, 453 and 454 on the zeroth order image 401. Also, the first order images 521, 522, 523 and 524 of the subaperture stop 15 are spaced apart from each other, but each first order image overlaps a different corner portion of the zeroth order image 501 to produce four separate interference patterns 551, 552, 553 and 554 on the zeroth order image 501. Each of the four interference patterns on each of the detectors 23, 24 and 25 is detected on a different quadrant of the particular detector.

A measurement of the phase difference between intensity fluctuations of the interference patterns appearing on corresponding quadrants of any two of the detectors 23, 24 and 25 can be made independently for each of the four quadrants of each detector by conventional instrumentation, as indicated schematically by the reference number 26 in FIG. 1. Thus, with respect to corresponding quadrants on the detectors 23 and 24, the phase relationship between intensity fluctuations of interference patterns 351 and 451 can be measured independently of the phase relationship between intensity fluctuations patterns 352 and 452. More generally, intensity fluctuations of the interference patterns 351, 451, and 551, which appear on corresponding quadrants of the detectors 23, 24 and 25, respectively, can be measured to determine the phase relationship of the interference pattern for any one subaperture wavefront with respect to the corresponding interference patterns for other subaperture wavefronts being analyzed.

The interference patterns appearing along the same diagonal on the face of a particular quadrant detector are redundant, because the phases of the two first order images that overlap diagonally opposite corner portions of the zeroth order image of a particular subaperture are necessarily correlated with each other. Hence, for the detector 23, the interference patterns 351 and 353 are redundant with respect to each other, and the interference patterns 352 and 354 are redundant with respect to each other. Similarly, for the detector 24, the interference patterns 451 and 453 are redundant with respect to each other, and the interference patterns 452 and 454 are redundant with respect to each other; and for the detector 25, the interference patterns 551 and 553 are redundant with respect to each other, and the interference patterns 552 and 554 are redundant with respect to each other. Therefore, to determine phase relationships between intensity fluctuations of corresponding interference patterns on zeroth order images of different subapertures, it is only necessary to make two phase measurements for each quadrant detector. Intensity fluctuations of the interference patterns appearing on two non-diagonal quadrants of one detector can be independently compared with intensity fluctuations of the interference patterns appearing on the corresponding two non-diagonal quadrants of any other detector to measure any phase difference that may exist between the interference patterns on corresponding quadrants of the different detectors.

If a known spatial relationship is maintained between the subapertures 13, 14 and 15, the focussing lens 16 and the diffraction grating 17, which is a requirement for any Hartmann-type instrument used for measuring wavefront tilt and other aberrations, a measurement of the focussed spot positions on the diffraction grating 17 can provide a measurement of tilt for each of the subaperture wavefronts A, B and C. From the tilt measurements of the various subaperture wavefronts A, B and C, it is possible by well-known techniques to construct a mathematical representation of the beam wavefront. From measurements of the tilts of the sample wavefronts B and C with respect to the reference wavefront A, it is possible by well-known techniques to measure other aberrations such as coma and astigmatism, and to effect corrections to the beam using, e.g., beam-steering devices and deformable mirrors.

The present invention has been described above in terms of particular embodiments and applications. However, other embodiments and applications for the invention would be apparent to workers skilled in the art upon perusal of the above description and accompanying drawing, which are merely illustrative of the invention. The invention is defined by the following claims and their equivalents.

I claim:

1. A method for making tilt measurements of a first optical wavefront relative to a second optical wavefront, said first wavefront being defined by a first aperture and said second wavefront being defined by a second aperture, said method comprising the steps of:
   (a) causing images of said first aperture formed by different orders of diffraction components of said first wavefront to interfere with each other, thereby producing first wavefront interference patterns;
   (b) causing images of said second aperture formed by said different orders of diffraction components of said second wavefront to interfere with each other, thereby producing second wavefront interference patterns;
   (c) causing periodic temporal fluctuations in intensity of said first wavefront interference patterns and of said second wavefront interference patterns; and
   (d) determining a phase relationship between the intensity fluctuations of one of said first wavefront interference patterns and the intensity fluctuations of a corresponding one of said second wavefront interference patterns, said phase relationship being a quantitative measure of tilt of said first wavefront relative to said second wavefront.

2. The method of claim 1 wherein the causing of said images of said first aperture to interfere with each other, and the causing of said images of said second aperture to interfere with each other, are accomplished by:
   (a) diffracting said first wavefront by a grating means on which two sets of lines are provided, the lines of each set being evenly spaced from each other, the lines of one set intersecting the lines of the other set, said one set of lines causing separation of said first wavefront into zeroth and higher order diffraction components along a first direction, said other set of lines causing separation of said first wavefront into zeroth and higher other diffraction components along a second direction, said second direction being different from said first direction, the higher order diffraction components of said first wavefront being displaced from the zeroth order diffraction component along each of said directions so that: (i) the image of said first aperture formed by the zeroth order diffraction component caused by said one set of lines substantially coincides with the image of said first aperture formed by the zeroth order diffraction component caused by said other set of lines, (ii) the images of said first aperture formed by the diffraction components of a particular higher order caused by said one set of lines are offset from the images of said first aperture formed by the diffraction components of said particular higher order caused by said other set of lines, and (iii) the images of said first aperture formed by the diffraction components of said particular higher order caused by both sets of lines overlap the coinciding images of the first aperture formed by the zeroth order diffraction components of said first wavefront; and
   (b) diffracting said second wavefront by said grating means, said one set of lines on said grating means causing separation of said second wavefront into zeroth and higher other diffraction components along a third direction, said other set of lines on said grating means causing separation of said second wavefront into zeroth and higher order diffraction components along a fourth direction, the higher order diffraction components of said second wavefront being displaced from the zeroth other diffraction component along each of said third and fourth directions so that: (i) the image of said second aperture formed by the zeroth order diffraction component caused by said one set of lines substantially coincides with the image of said second aperture formed by the zeroth order diffraction component caused by said other set of lines, (ii) the images of said second aperture formed by the diffraction components of a particular higher order caused by said one set of lines are offset from the images of said second aperture formed by the diffraction components of said particular higher order caused by said other set of lines, and (iii) the images of said second aperture formed by the diffraction components of said particular higher order caused by both sets of lines overlap the coinciding images of the second aperture formed by the zeroth order diffraction components of said second wavefront.

3. The method of claim 2 wherein the causing of said periodic temporal fluctuations in intensity of said first wavefront interference patterns and of said second wavefront interference patterns is accomplished by moving the lines on said grating means relative to said first and second wavefronts.

4. The method of claim 3 wherein the determining of phase relationship between the intensity fluctuations of one of said first wavefront interference patterns and a corresponding one of said second wavefront interference patterns is accomplished by:

(a) detecting images of said first aperture formed on a first detector by the zeroth order components and the components of said particular higher order of the diffracted first wavefront caused by both sets of lines, a single zeroth order image of said first aperture resulting from the coinciding zeroth order diffraction components, the images of said particular higher order caused by said one set of lines being displaced from said zeroth order image along a first image axis on said first detector and the images of said particular higher order caused by said other set of lines being displaced from said zeroth order image along a second image axis on said first detector, said first and second image axes intersecting each other at an angle determined by said first and second directions along which the diffraction components of said first wavefront are separated, said particular higher order images along said first image axis being offset from said particular higher order images along said second image axis, said particular higher order images along said first and second image axes overlapping said single zeroth order image of said first aperture to produce said first wavefront interference patterns at separate locations on said first detector;

(b) detecting images of said second aperture formed on a second detector by the zeroth order components and the components of said particular higher order of the diffracted second wavefront caused by both sets of lines, a single zeroth order image of said second aperture resulting from the coinciding zeroth order diffraction components, the images of said particular higher order caused by said one set of lines being displaced from said zeroth order image along a third image axis on said second detector and the images of said particular higher order caused by said other set of lines being displaced from said zeroth order image along a fourth image axis on said second detector, said third and forth image axes intersecting each other at an angle determined by said third and fourth directions along which the diffraction components of said second wavefront are separated, said particular higher order images along said third image axis being offset from said particular higher order images along said fourth image axis, said particular higher order images along said third and fourth image axes overlapping said single zeroth order image of said second aperture to produce said second wavefront interference patterns at separate locations on said second detector; and (c) measuring any phase difference that occurs between the intensity fluctuations of one of said interference patterns on said first density and the intensity fluctuations of a corresponding one of said interference patterns on said second detector.

5. The method of claim 4 wherein the measuring of any phase difference occurring between the intensity fluctuations of one of said interference patterns on said first density and the intensity fluctuations of a corresponding one of said interference patterns on said second detector further includes:

(a) sensing the intensities of interference patterns on each of said first and second image axes on said first detector;

(b) sensing the intensities of interference patterns on each of said third and fourth image axes on said second detector;

(c) transforming said third and fourth image axes on said second detector as necessary to correspond to said first and second image axes on said first detector;

(d) measuring the phase difference between the intensity fluctuations of one of the interference patterns on said first image axis on said first detector and the intensity fluctuations of a corresponding one of the interference patterns on the transformed third image axis on said second detector; and (e) measuring the phase difference between the intensity fluctuations of one of the interference patterns on said second image axis on said first detector and the intensity fluctuations of a corresponding one of the interference patterns on the transformed fourth axis on said second detector.

6. The method of claim 5 wherein said first and second detectors are quadrant detectors, and wherein the sensing of the intensities of said interference patterns on said first and second detectors is accomplished by positioning said first and second detectors so that each first wavefront interference pattern is located on a separate quadrant of said first detector, and each second wavefront interference pattern is located on a separate quadrant of said second detector.

7. The method of claim 4 wherein the detecting of said images of said first aperture on said first detector is accomplished by collimating said zeroth and particular higher order components of the diffracted first wavefront to impinge upon said first detector, and wherein the detecting of said images of said second aperture on said second detector is accomplished by collimating said zeroth and particular higher order components of the diffracted second wavefront to impinge upon said second detector.

8. The method of claim 2 wherein the diffracting of said first and second wavefronts by said grating means is accomplished by focussing said first wavefront into a first spot on said grating means and focussing said second wavefront into a second spot on said grating means.

9. The method of claim 8 wherein said grating means comprises a cylinder, with said two intersecting sets of lines being located on a surface portion of said cylinder, whereby rotation of said cylinder about its axis causes motion of said sets of lines relative to said focussed spots.

10. The method of claim 8 wherein said grating means comprises a rotary disc with said two intersecting sets of lines being located on a portion of said disc, whereby rotation of said disc causes motion of said sets of lines relative to said focussed spots.

11. The method of claim 10 wherein said first and second apertures are of generally square shape, whereby the zeroth order image formed on said first detector by the zeroth order components of the diffracted first wavefront substantially fills all quadrant of said first detector, and the interference patterns between the zeroth order image and the images formed by the first order components of the diffracted first wavefront lie on separate quadrants of said first detector, and whereby the zeroth order image formed on said second detector by the zeroth order components of the diffracted second wavefront substantially fills all quadrants of said second detector, and the interference patterns between the zeroth order image and the images formed by the first order components of the diffracted second wavefront lie on separate quadrants of said second detector.

12. The method of claim 10 wherein said two intersecting sets of lines are located on a first annular surface portion of said rotary disc, and two different intersecting sets of lines are located on a second annular surface portion of said rotary disc, the diffracting of said first and second wavefronts being accomplished by focussing said first wavefront into said first spot on said first annular surface portion and by focussing said second wavefront into said second spot on said second annular surface portion.

13. The method of claim 1 wherein said first and second apertures are first and second subapertures, respectively, in a mask interposed in an optical beam emanating from a monochromatic source.

14. An apparatus for making tilt measurements of a first optical wavefront relative to a second optical wavefront, said first wavefront being defined by a first aperture and said second wavefront being defined by a second aperture, said apparatus comprising:
(a) means for causing images of said first aperture formed by different orders of diffraction components of said first wavefront to interfere with each other, thereby producing first wavefront interference patterns, and for causing images of second aperture formed by said different orders of diffraction components of said second wavefront to interference with each other, thereby producing second wavefront interference patterns;
(b) means for causing periodic temporal fluctuations in intensity of said first wavefront interference patterns and of said second wavefront interference patterns; and
(c) means for determining a phase relationship between the intensity fluctuations of one of said first wavefront interference patterns and the intensity fluctuations of a corresponding one of said second wavefront interference patterns, said phase relationship being a quantitative measure of tilt of said first wavefront relative to said second wavefront.

15. The apparatus of claim 14 wherein said means for causing said images of said first aperture to interfere with each other and for causing said images of said second aperture to interfere with each other comprises a diffraction grating on which two sets of lines are provided, the lines of each set being evenly spaced from each other, the lines of one set intersecting the lines of the other set; said one set of lines causing separation of said first wavefront into zeroth and higher order diffraction components along a first direction, said other set of lines causing separation of said first wavefront into zeroth and higher order diffraction components along a second direction, said second direction being different from said first direction, the higher order diffraction components of said first wavefront being displaced from the zeroth order diffraction component along each of said first and second directions so that: (i) the image of said first aperture formed by the zeroth order diffraction component caused by said one set of lines substantially coincides with the image of said first aperture formed by the zeroth order diffraction component causes by said other set of lines, (ii) the images of said first aperture formed by the diffraction components of a particular higher order caused by said one set of lines are offset from the images of said first aperture formed by the diffraction components of said particular higher order caused by said other set of lines, and (iii) the images of said first aperture formed by the diffraction components of said particular higher order caused by both sets of lines overlap the coinciding images of the first aperture formed by the zeroth order diffraction components of said first wavefront; and said one set of lines causing separation of said second wavefront into zeroth and higher order diffraction components along a third direction, said other set of lines causing separation of said second wavefront into zeroth and higher order diffraction components along a fourth direction, said fourth direction being different from said third direction, the higher order diffraction components of said second wavefront being displaced from the zeroth order diffraction component along each of said third and fourth directions so that: (i) the image of said second aperture formed by the zeroth order diffraction component caused by said one set of lines substantially coincides with the image of said second aperture formed by the zeroth order diffraction component caused by said other set of lines, (ii) the images of said second aperture formed by the diffraction components of a particular higher order caused by said one set of lines are offset from the images of said second aperture formed by the diffraction components of said particular higher order caused by said other set of lines, and (iii) the images of said second aperture formed by the diffraction components of said particular higher order caused by both sets of lines overlap the coinciding images of the second aperture formed by the zeroth order diffraction components of said second wavefront.

16. The apparatus of claim 15 wherein said means for causing of said periodic temporal fluctuations in intensity of said first wavefront interference patterns and of said second wavefront interference patterns comprises means for moving the lines on said diffraction grating relative to said first and second wavefronts.

17. The apparatus of claim 16 wherein said means for determining a phase relationship between the intensity fluctuations of one of said first wavefront interference patterns and a corresponding one of said second wavefront interference patterns comprises:

(a) a first detector for detecting images of said first aperture formed by the zeroth order components and the components of said particular higher order of the diffraction first wavefront caused by both sets of lines, a single zeroth order image of said first aperture resulting from the coinciding zeroth order diffraction components, the images of said particular higher order caused by said one set of lines being displaced from said zeroth order image along a first image axis on said first detector and the images of said particular higher order caused by said other set of lines being displaced from said zeroth order image along a second image axis on said first detector, said first and second image axes intersecting each other at an angle determined by said first and second directions along with the diffraction components of said first wavefront are separated, said particular higher order images along said first image axis being offset from said particular higher order images along said second image axis, said particular higher order images along said first and second image axes overlapping said single zeroth order image of said first aperture to produce said first wavefront interference patterns at separate locations on said first detector;

(b) a second detector for detecting images of said second aperture formed by the zeroth order components and the components of said particular higher order of the diffracted second wavefront caused by both set of lines, a single zeroth order image of said second aperture resulting from the coinciding zeroth order diffraction components, the images of said particular higher order caused by said one set of lines being displaced from said zeroth order image along a third image axis on said second detector and the images of said particular higher order caused by said other set of lines being displaced from said zeroth order image along a fourth image axis on said second detector, said third and forth image axes intersecting each other at an angle determined by said third and fourth directions along which the diffraction components of said second wavefront are separated, said particular higher order images along said third image axis being offset from said particular higher order images along said fourth image axis, said particular higher order images along said third and fourth image axes overlapping said single zeroth order image of said second aperture to produce said second wavefront interference patterns at separate locations on said second detector; and (c) means for measuring any phase difference that occurs between the intensity fluctuations of one of said interference patterns on said first detector and the intensity fluctuations of a corresponding one of said interference patterns on said second detector.

18. The apparatus of claim 17 wherein said means for measuring any phase difference occurring between the intensity fluctuations of one of said interference patterns on said first detector and the intensity fluctuations of a corresponding one of said interference patterns on said second detector further includes:

(a) means for sensing the intensities of interference patterns on each of said first and second image axes on said first detector;

(b) means for sensing the intensities of interference patterns on each of said third and fourth image axes on said second detector;

(c) means for transforming said third and fourth image axes on said second detector as necessary to corresond to said first and second image axes on said first detector;

(d) means for measuring the phase difference between the intensity fluctuations of one of the interference patterns on said first image axis on said first detector and the intensity fluctuations of a corresponding one of the interference patterns on the transformed third image axis on said second detector; and (e) means for measuring the phase difference between the intensity fluctuations of one of the interference patterns on said second image axis on said first detector and the intensity fluctuations of a corresponding one of the interference patterns on the transformed fourth image axis on said second detector.

19. The apparatus of claim 18 wherein said first and second detectors are quadrant detectors, and wherein said first and second detectors are positioned so that each first wavefront interference pattern is located on a separate quadrant of said first detector and each second wavefront interference pattern is located on a separate quadrant of said second detector.

20. The apparatus of claim 17 further comprising means for collimating said zeroth and particular higher order components of the diffracted first wavefront to impinge upon said first detector, and means for collimating said zeroth and particular higher order components of the diffracted second wavefront to impinge upon said second detector.

21. The apparatus of claim 15 wherein said means for causing said images of said first aperture to interfere with each other and for causing said images of said second aperture to interfere with each other further comprises means for focussing said first wavefront into a first spot on said diffraction grating and for focussing said second wavefront into a second spot on said diffraction grating.

22. The apparatus of claim 21 wherein said diffraction grating comprises a rotary disc with said two intersecting sets of lines being located on a portion of said disc, whereby rotation of said disc causes motion of said two sets of lines relative to said focussed spots.

23. The apparatus of claim 22 wherein said two intersecting sets of lines are located on a first annular surface portion of said rotary disc, and two different intersecting sets of lines are located on a second annular surface portion of said rotary disc, whereby diffraction of said first and second wavefronts is accomplished by focussing said first wavefront into said first spot on said first annular surface portion and by focussing said second wavefront into said second spot on said second annular surface portion.

24. The apparatus of claim 22 wherein the two sets of lines on said second annular surface portion of said rotary disc have orientations and spacing that are independent of the orientations and spacing of the two sets of lines on said first annular surface portion of said rotary disc.

25. The apparatus of claim 24 wherein the spacings of the lines on each of said first and second annular surface portions of said rotary disc are marked in order to prevent ambiguity as to which particular annular surface portion is causing diffraction of a particular spot of light at any given time.

26. The apparatus of claim 22 wherein said first and second apertures are of generally square shape, whereby the zeroth order image formed on said first detector by the zeroth order components of the diffracted first wavefront substantially fills all quadrants of said first detector, and the interference patterns between the zeroth order image and the images formed by the first order components of the diffracted first wavefront lie on separate quadrants of said first detector, and whereby the zeroth order image formed on said second detector by the zeroth order components of the diffracted second wavefront substantially fills all quadrants of said second detector, and the interference patterns between the zeroth order image and the images formed by the first order components of the diffracted second wavefront lie on separate quadrants of said second detector.

27. The apparatus of claim 21 wherein said two sets of lines on said diffraction grating comprise substantially straight lines.

28. The apparatus of claim 21 wherein at least one of said two sets of lines on said diffraction grating comprises curved lines.

29. The apparatus of claim 21 wherein said diffraction grating comprises a cylinder, with said two intersecting sets of lines being located on a surface portion of said cylinder, whereby rotation of said cylinder about its axis causes motion of said sets of lines relative to said focussed spots.

30. The apparatus of claim 14 wherein said first and second apertures are first and second subapertures, respectively, in a mask interposed in an optical beam emanating from a monochromatic source.

* * * * *